(12) United States Patent
Kim et al.

(10) Patent No.: US 11,071,110 B2
(45) Date of Patent: Jul. 20, 2021

(54) METHOD AND DEVICE FOR ALLOCATING DYNAMIC FREQUENCY FOR SECONDARY USER IN COGNITIVE RADIO NETWORK

(71) Applicant: INDUSTRY-ACADEMIC COOPERATION FOUNDATION, YONSEI UNIVERSITY, Seoul (KR)

(72) Inventors: Seong-Lyun Kim, Seoul (KR); Jee Min Kim, Goyang-si (KR); Hye Sung Kim, Seoul (KR); Han Cha, Seoul (KR); Seung-Woo Ko, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 129 days.

(21) Appl. No.: 16/478,016

(22) PCT Filed: Jan. 18, 2017

(86) PCT No.: PCT/KR2017/000626
§ 371 (c)(1),
(2) Date: Sep. 10, 2019

(87) PCT Pub. No.: WO2018/131740
PCT Pub. Date: Jul. 19, 2018

(65) Prior Publication Data
US 2020/0214010 A1    Jul. 2, 2020

(30) Foreign Application Priority Data

Jan. 13, 2017  (KR) .......................... 10-2017-0006412

(51) Int. Cl.
*H04W 72/04*    (2009.01)
*H04W 72/08*    (2009.01)

(52) U.S. Cl.
CPC ..... *H04W 72/0453* (2013.01); *H04W 72/048* (2013.01); *H04W 72/08* (2013.01)

(58) Field of Classification Search
CPC . H04W 72/04; H04W 72/08; H04W 72/0453; H04W 72/048
See application file for complete search history.

(56) References Cited

U.S. PATENT DOCUMENTS

2006/0286934 A1* 12/2006 Kuffner ................. H04W 16/14
455/63.1
2009/0247201 A1* 10/2009 Ye ......................... H04W 16/14
455/509

(Continued)

FOREIGN PATENT DOCUMENTS

JP    2007-300419 A    11/2007
JP    2009-200773 A    9/2009

(Continued)

OTHER PUBLICATIONS

Mubashir Husain Rehmani, "Channel assortment strategy for reliable communication in multi-hop cognitive radio networks", In: IEEE, World of Wireless Mobile and Multimedia Networks (WoWMoM), 2010 IEEE International Symposium, Aug. 3, 2010 (https://ieeexplore.ieee.org/document/5534972) reference section I-II.

*Primary Examiner* — Chi Ho A Lee

(57) ABSTRACT

Provided is a device for allocating a dynamic frequency for a secondary user in a cognitive radio network. The device includes: an OP map generation unit for generating an opportunity map, which represents a probability of successful communication of the secondary transmitter in each region of the cognitive radio network, by using one or more of spectrum sensing information, which is received from a spectrum sensor that has completed sensing and includes identifier information, location information, and a sensing measurement matrix, an access request message, which is (Continued)

received from the secondary transmitter and includes identifier information, location information, and operable band information, and the density and transmission powers of primary transmitters; and a response message generation unit for generating a response message, which includes the channel having the highest probability of successful communication and the probability of successful communication, based on the generated map.

11 Claims, 4 Drawing Sheets

(56) References Cited

U.S. PATENT DOCUMENTS

| | | | | |
|---|---|---|---|---|
| 2011/0287802 | A1* | 11/2011 | Ma | H04W 72/0453 455/517 |
| 2012/0172049 | A1* | 7/2012 | Wu | H04W 72/0473 455/452.1 |
| 2012/0315855 | A1* | 12/2012 | Li | H04W 16/14 455/67.7 |
| 2013/0273959 | A1* | 10/2013 | Wu | H04W 24/00 455/517 |
| 2015/0180689 | A1* | 6/2015 | Deriche | H04L 27/0006 370/330 |
| 2016/0088486 | A1* | 3/2016 | Taher | H04W 72/085 455/454 |
| 2016/0095129 | A1* | 3/2016 | Hoyhtya | H04W 72/0446 370/330 |
| 2017/0208476 | A1* | 7/2017 | Khambekar | H04B 17/318 |
| 2017/0215079 | A1* | 7/2017 | Fortman | H04L 27/0006 |
| 2018/0139629 | A1* | 5/2018 | Chakrabarti | H04W 28/20 |
| 2018/0213407 | A1* | 7/2018 | Miao | H04W 16/14 |

FOREIGN PATENT DOCUMENTS

| | | |
|---|---|---|
| KR | 10-2013-0004929 A | 1/2013 |
| KR | 10-2015-0022874 A | 3/2015 |

* cited by examiner

[Fig. 1]
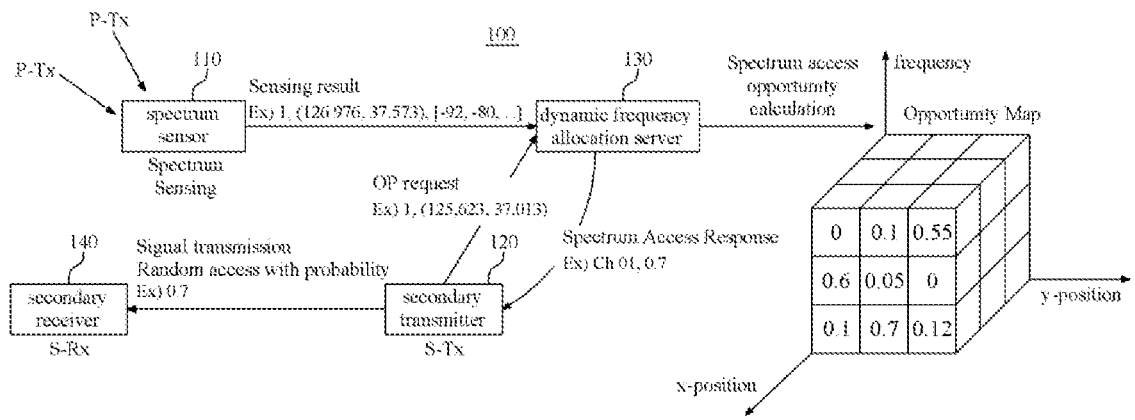
The number of each block represents the opportunity value of the secondary transmitter/receiver, and each block can be represented in a different color according to the opportunity value.
(E.g. higher opportunity values have bluer colors, lower opportunity values have redder colors)
[Fig. 2]
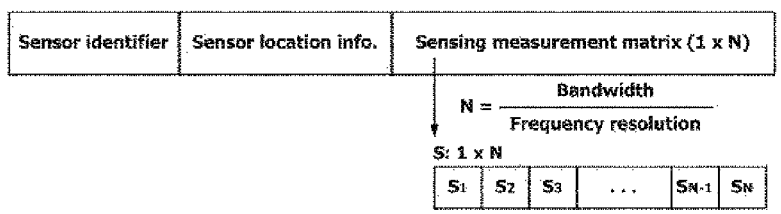

[Fig. 3]
Access Request Message(ARM) format
| S-Tx identifier | S-Tx location info. | S-Tx RF info. : Operable spectrum range info. |
|---|---|---|
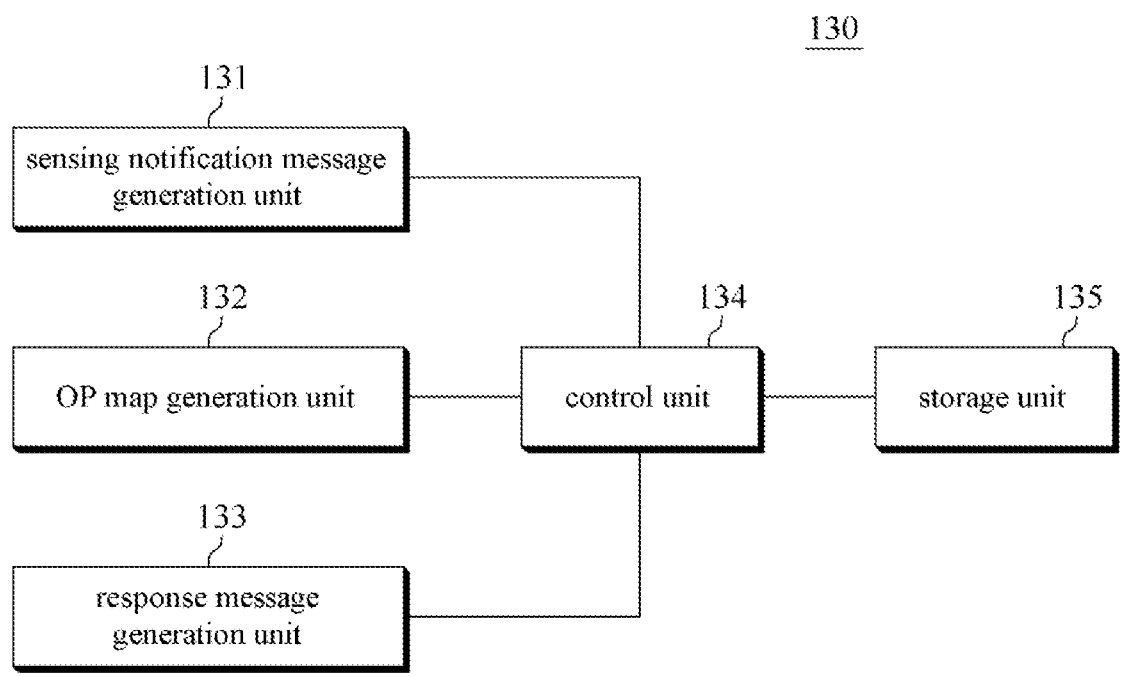
[Fig. 4]

[Fig. 5]
Sensing Notification Message(SNM) format
| Target spectrum band information: Center frequency and bandwidth | Sensing resolution for frequency and Time resolution |
|---|---|
[Fig.6]
Sensor-Location Table
1  (124.241, 37.325)
2  (120.874, 34.239)
3  (128.921, 37.325)
4  (121.324, 37.109)
5  (122.241, 38.562)
... ...
M  (128.241, 35.567)
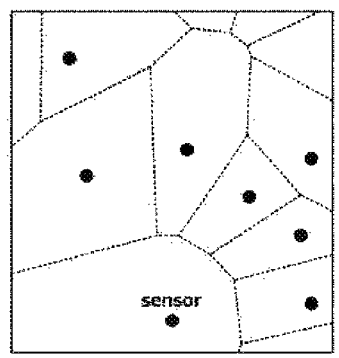
[Fig.7]
Spectrum Access Response Message(SARM) format
| S-Tx identifier | S-Tx location info. | Accessible channel index | Access opportunity |
|---|---|---|---|

[Fig.8]
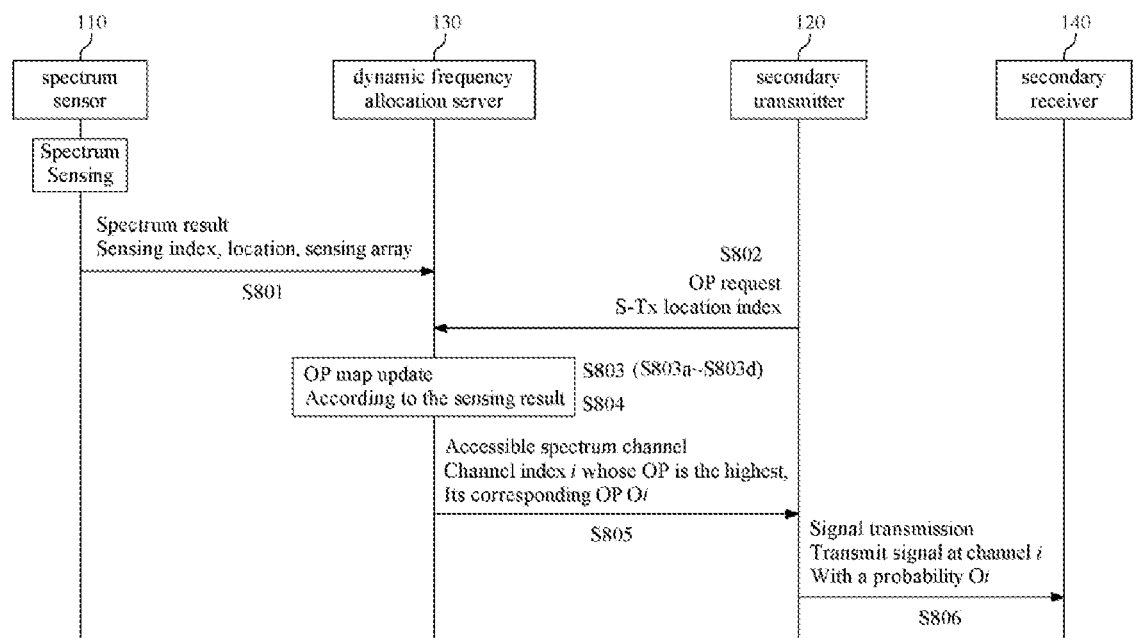

METHOD AND DEVICE FOR ALLOCATING DYNAMIC FREQUENCY FOR SECONDARY USER IN COGNITIVE RADIO NETWORK

CROSS-REFERENCE TO RELATED APPLICATIONS

This application is a National Phase application of PCT International Application No. PCT/KR2017/000626, which was filed on Jan. 18, 2017, and which claims priority from Korean Patent Application No. 10-2017-0006412 filed with the Korean Intellectual Property Office on Jan. 13, 2017. The disclosures of the above patent applications are incorporated herein by reference in their entirety.

BACKGROUND

1. Technical Field

The present invention relates to a method and device for allocating dynamic frequencies for secondary users in a cognitive radio network, more particularly to the allocation of dynamic frequencies for secondary users by using a frequency access OP map (opportunity map), which represents the frequency access opportunities of the secondary users.

2. Description of the Related Art

In contrast to conventional radio communication technology that occupies radio resources using a single frequency band and a single protocol, cognitive radio communication technology is a technology that can maximize frequency spectrum use efficiency by surveying the surrounding environment, making adaptations quickly, intelligently avoiding interference, and at each moment occupying a frequency spectrum that is not being used.

As an example of such cognitive radio communication technology, a frequency sensing map was proposed, which represents frequency occupancy regions as a map in consideration of the location and transmission power of the primary user.

The sensing map can display the strength of the signals transmitted from primary users according to location and coverage area of the primary network, and the information included in the sensing map can be utilized to provide locations and frequency resources for communication by unlicensed secondary users without sacrificing the communication by the primary users.

To compose such a sensing map, it is necessary that the values of the strengths of the signals transmitted from the primary users be known in all regions.

However, as it is impossible to install a frequency sensor in every region, an interference cartography technique, which considers interference, is utilized to predict the reception signal strengths in regions where sensors are unavailable.

As this technique fills in the frequency access opportunity of the sensing map by performing spatial interpolation based on the locations and transmission powers of the primary users, only the locations and transmission powers of the primary transmitters are reflected, and the interference distribution between primary users and secondary users is not considered. As such, there is the problem of lowered accuracy when it is applied to actual dynamic frequency access-based communication.

In particular, in a network environment where the locations of the primary users cannot be known precisely, the accuracy may suffer even further.

Also, while the related art employs a method of determining frequency access opportunities by considering several frequency sensors simultaneously in order to compose a sensing map, this entails a very high degree of calculation complexity, so that there are difficulties in determining frequency access opportunities in real time.

SUMMARY OF THE INVENTION

An aspect of the invention, conceived to resolve the problems of the related art described above, is to provide a way of supplying frequency access opportunities to secondary users as much as possible for increased frequency reuse without sacrificing the communication performance of primary users in a cognitive radio network composed of low-performance terminals that are not equipped with sensing functions, such as terminals associated with the Internet of small things.

To achieve the objective above, an embodiment of the present invention provides a dynamic frequency allocation device for allocating a dynamic frequency for a secondary user in a cognitive radio network, where the dynamic frequency allocation device may include: an OP map generation unit configured to generate an OP (opportunity) map, which represents a probability of successful communication of the secondary transmitter in each region of the cognitive radio network, by using one or more of spectrum sensing information, which is received from a spectrum sensor that has completed sensing and includes identifier information, location information, and a sensing measurement matrix, an access request message, which is received from a secondary transmitter wishing to acquire a frequency access opportunity and includes identifier information, location information, and operable band information, and the density and transmission powers of primary transmitters; and a response message generation unit configured to generate a response message, which includes the channel having the highest probability of successful communication from among channels accessible from the location of the secondary transmitter as well as the probability of successful communication, based on the generated map. Here, the probability of successful communication may be the probability of a SINR (signal-to-interference-plus-noise ratio) at a particular location exceeding a predefined reference value $\theta^*$, and the OP map representing the probability of successful communication in each region may include the probability of successful communication of the secondary transmitter in a region in which the spectrum sensor is not installed.

To achieve the objective above, an embodiment of the present invention provides a dynamic frequency allocation method by which a dynamic frequency allocation device may allocate a dynamic frequency for a secondary user in a cognitive radio network, where the dynamic frequency allocation method may include: (a) receiving spectrum sensing information, which includes identifier information, location information, and a sensing measurement matrix, from a spectrum sensor that has completed sensing; (b) receiving an access request message, which includes identifier information, location information, and operable band information, from a secondary transmitter wishing to acquire a frequency access opportunity; (c) generating an OP (opportunity) map, which represents the probability of successful communication of the secondary transmitter in each region of the cognitive radio network, by using one or more of the received spectrum sensing information, access request message, and a density and transmission powers of primary transmitters; and (d) generating a response message, which includes the channel having the highest probability of successful communication from among channels accessible from the location of the secondary transmitter and the probability of successful communication, based on the generated map. Here, the probability of successful communication may be the probability of the SINK (signal-to-interference-plus-noise ratio) at a particular location exceeding a predefined reference value θ*, and the OP map representing the probability of successful communication of in each region may include the probability of successful communication of the secondary transmitter in a region in which the spectrum sensor is not installed.

With an embodiment of the present invention, the rate of frequency reuse can be increased by providing frequency access opportunities to secondary users as much as possible without sacrificing the communication performance of primary users in a cognitive radio network composed of low-performance terminals that are not equipped with sensing functions.

The advantageous effects of the present invention are not limited to the effect described above but rather encompass all effects that can be deduced from the composition of the present invention as set forth in the detailed description or the scope of claims.

BRIEF DESCRIPTION OF THE DRAWINGS

FIG. 1 illustrates the composition of a system for allocating a dynamic frequency for a secondary user in a cognitive radio network according to an embodiment of the present invention.

FIG. 2 illustrates the format of a message associated with spectrum sensing information according to an embodiment of the present invention.

FIG. 3 illustrates the format of an access request message according to an embodiment of the present invention.

FIG. 4 is a block diagram illustrating the composition of a dynamic frequency allocation server according to an embodiment of the present invention.

FIG. 5 illustrates the format of a sensing notification message according to an embodiment of the present invention.

FIG. 6 illustrates an example of designating a covered region for each spectrum sensor according to an embodiment of the present invention.

FIG. 7 illustrates the format of a spectrum access response message according to an embodiment of the present invention.

FIG. 8 is a flow diagram illustrating the process of allocating a dynamic frequency for a secondary user in a cognitive radio network according to an embodiment of the present invention.

DETAILED DESCRIPTION OF THE INVENTION

In the following, the present invention will be described with reference to the accompanying drawings. However, the present invention can be implemented in various different forms and is not limited to be limited to the embodiments described herein.

In the drawings, parts that are not relevant to the descriptions have been omitted for a clearer understanding of the present invention, and throughout the specification, similar reference numerals have been assigned for similar parts.

In the specification, when a part is mentioned as being "connected" with another part, this refers not only to cases where the parts are "directly connected" but also encompasses cases where the parts are "indirectly connected" with another member positioned in-between.

Also, when a part is mentioned as "including" an element, this does not exclude the presence of other elements and means that other elements can further be included, unless there is specific mention to the contrary.

Embodiments of the present invention are described below in detail with reference to the accompanying drawings.

FIG. 1 illustrates the composition of a system for allocating a dynamic frequency for a secondary user in a cognitive radio network according to an embodiment of the present invention.

Incidentally, the cognitive radio network illustrated in FIG. 1 represents a case in which low-performance terminals lacking a frequency sensing function (e.g. Internet of small things terminals, etc.), or in other words, locations where frequency sensing cannot be performed, are present within the network.

In an embodiment of the present invention, primary users can include DTV, LTE, WiFi, military/commercial aviation radar users (or the users' terminals), while secondary users can include terminals that are not equipped with a sensing function such as public safety LTE terminals, licensed-assisted access LTE terminals, device-to-device LTE terminals, smart metering terminals, etc.

The system 100 for allocating a dynamic frequency for a secondary user according to an embodiment of the present invention illustrated in FIG. 1 can include spectrum sensors 110, a secondary transmitter 120, a dynamic frequency allocation server 130, and a secondary receiver 140.

Looking at each of the elements briefly, the spectrum sensors 110 can sense frequencies at their respective install locations.

Here, the sensing information concerning a frequency band, frequency unit, limit time, etc., can be changed according to the settings of the dynamic frequency allocation server 130, and the spectrum sensors 110 can receive sensing notification messages (SNM's), which may include information on the above, from the dynamic frequency allocation server 130.

A spectrum sensor 110 that has received a sensing notification message from the dynamic frequency allocation server 130 can begin taking measurements for the relevant frequency band based on the received sensing notification message.

Here, the method by which a spectrum sensor 110 measures the frequency band can employ a technique such as energy-based sensing, cyclostationary feature-based sensing, matched filter-based sensing, etc.

A spectrum sensor 110 that has completed the sensing can transmit spectrum sensing information (SSI), which may include the spectrum sensor's identifier information, location information, and a sensing measurement matrix (SMM), to the dynamic frequency allocation server 130.

A possible format for a message associated with the spectrum sensing information transmitted by the spectrum sensor 110 to the dynamic frequency allocation server 130 is illustrated in FIG. 2.

The secondary transmitter 120 can generate an access request message (ARM), which may include its identifier information, location information, and operable band information, in order to acquire a frequency access opportunity, and can send the access request message to the dynamic frequency allocation server 130.

A possible format for an access request message transmitted by the secondary transmitter 120 to the dynamic frequency allocation server 130 for acquiring a frequency access opportunity is illustrated in FIG. 3.

Also, the secondary transmitter 120 can receive a spectrum access response message (SARM), which may be a response to the access request message (ARM), from the dynamic frequency allocation server 130.

The spectrum access response message can include information on the channel having the highest probability of successful communication (or opportunity value; hereinafter referred to as 'OP value') from among the candidate frequency channels accessible by the secondary transmitter 120 and the corresponding OP value.

Here, the OP value can represent the probability that the SINR (signal-to-interference-plus-noise ratio) which can be provided to the secondary transmitter 120 while ensuring protection of the primary network exceeds a particular reference value.

The secondary transmitter 120 can attempt a signal transmission by using the channel included in the spectrum access response message (SARM), where a random function can be used to either attempt transmission according to the transmission probability or standby probability associated with the OP value or wait for a particular duration of time without attempting transmission.

Also, the secondary transmitter 120 can transmit a signal to the secondary receiver 140, where the OP value can be reflected as is when transmitting the signal.

Incidentally, the secondary transmitter 120 referred to below can be the terminal of a secondary user and can be used not only to refer to a secondary transmitter 120 but also to encompass the meaning of a secondary receiver 140.

The dynamic frequency allocation server 130 can be a control unit and can generate sensing notification messages (SNM), which may include information regarding the frequency band for sensing, frequency unit, and limit time, etc., and can provide the sensing notification messages (SNM's) to the spectrum sensors 110.

Also, the dynamic frequency allocation server 130 can generate an OP (opportunity) map, which may represent the probability of successful communication (opportunity value) of the secondary transmitter in each region of the cognitive radio network, based on the spectrum sensing information (SSI) including the identifier information, location information, and sensing measurement matrix received from the spectrum sensors 110, the access request message (ARM) including the identifier information, location information, and operable band information received from the secondary transmitter 120, and the density and transmission powers of primary transmitters (not shown).

The dynamic frequency allocation server 130 can provide the spectrum access response message (SARM), which is a response to an access request message (ARM), to the secondary transmitter 120 that sent the access request message (ARM) to acquire a frequency access opportunity.

Here, the spectrum access response message may include information regarding the channel having the largest OP value from the location of the corresponding secondary transmitter 120 as well as the corresponding OP value.

Below, a more detailed description of the composition and operations of the dynamic frequency allocation server 130 is provided with reference to FIG. 4.

FIG. 4 is a block diagram illustrating the composition of a dynamic frequency allocation server 130 according to an embodiment of the present invention.

A dynamic frequency allocation server 130 according to an embodiment of the present invention can include a sensing notification message generation unit 131, an OP map generation unit 132, a response message generation unit 133, a control unit 134, and a storage unit 135.

Looking at each of the components, the sensing notification message generation unit 131 can generate the sensing notification messages (SNM's) and send them to the spectrum sensors 110.

The sensing notification messages (SNM's) can include the measurement frequency bands, frequency measurement units, measurement limit times, etc., of the respective spectrum sensors 110.

A possible format for a sensing notification message provided to a spectrum sensor 110 is illustrated in FIG. 5.

Here, the measurement frequency band is not limited to a particular band and can include various frequency bands according to the embodiment.

The sensing notification message generation unit 131 can configure the frequency measurement unit (frequency resolution) and measurement limit time (time resolution) for each measured frequency band to generate the sensing notification messages (SNM's).

For example, when there is a clear communication standard using a frequency band as in the case of the LTE cellular license band, the sensing notification message generation unit 131 can configure the frequency measurement unit in consideration of the minimum frequency resources and time unit specified by the standard.

The information regarding the measurement frequency band can be sent via a wired or wireless line depending on the environment in which the spectrum sensor 110 is installed and, in the case of a wireless line, can be broadcasted via a dedicated channel utilizing a base station or a separate radio unit present in the measured region.

Incidentally, the spectrum sensor 110 can be provided with information regarding the dedicated channel for receiving the sensing notification message (SNM), and the spectrum sensor 110 can detect the channel periodically.

The OP map generation unit 132 can generate a map (referred to herein as an opportunity map or OP map) representing OP values, which are values of probability of successful communication for the secondary transmitter, using one or more of the spectrum sensing information (SSI) received from the spectrum sensors 110, the access request message (ARM), which is related to the density and transmission power of secondary transmitters, received from the secondary transmitter 120, and the density and transmission powers of primary transmitters (not shown).

More specifically, in order to predict the OP value of each region, the OP map generation unit 132 can calculate the density $\lambda_2$ of secondary transmitters 120 that have sent access request messages (ARM's) for acquiring frequency access opportunities as the average number of secondary transmitters 120 that have sent access request messages (ARM's) per unit area.

For this, the OP map generation unit 132 can use the access request messages (ARM's) received from the secondary transmitters 120.

Afterwards, the OP map generation unit 132 can calculate the optimal SINR reference value θ* for predicting the OP value of each region by using [Equation 1] shown below.

Here, the density $\lambda_1$ and transmission powers $P_1$ of the primary transmitters (not shown) and the density $\lambda_2$ and transmission powers $P_2$ of the secondary transmitters 120 can be incorporated.

[Equation 1]

$$\theta^* = \max\left[\bar{\theta}, \operatorname*{argmax}_\theta \int_{x>0}\int_{r>0} \mathcal{P}_s(r,\theta)\right.$$

$$\left.\int_{\theta>0}\mathcal{P}_s(r, e^\theta - 1)\exp\left(-\pi\lambda_2\hat{\phi}_2^{\frac{2}{a}}d^2\rho_0(e^\theta - 1)\right)d\theta f_r(r)f_r(x)drdx\right]$$

where $\bar{\theta}$ satisfies the following equation: $\bar{\theta}\lambda_2\hat{\phi}_2 P_1^{\frac{2}{a}} p_0(\bar{\theta})(1-\tau) =$ $$\lambda_1 P_2^{\frac{2}{a}}(\tau + \rho(\bar{\theta})\tau - \rho(\bar{\theta})).$$

$$\mathcal{P}_2(r,\theta) = \frac{1}{2\pi}\int_0^{2\pi} \frac{P_2}{P_2 + P_1\theta d^a(r^2 - 2xr\cos(t) + x^2)^{-\frac{a}{2}}}$$

$$dt \times \exp\left(-\lambda_1\left[\int_{r+x}^\infty \frac{2_1\theta d^a y^{-a+1}}{P2 + P_1\theta d^a y^{-a}}dy + \right.\right.$$

$$\int_{|r-x|}^{r+x} \frac{2a\cos\left(\frac{r^2 - x^2 - y^2}{2xy}\right)P_1\theta d^a y^{-a+1}}{P_2 + P_1\theta d^a y^{-a}}dy +$$

$$\left.\left.\int_{\max(0,r-x)}^{|r-x|} \frac{2\pi P_1\theta d^a y^{-a+1}}{P_2 + P_1\theta d^a y^{-a}}dy\right]\right)$$

$$p_0(\theta) = \theta^{\frac{2}{a}}\int_0^\infty \frac{du}{1 + u^{\frac{2}{a}}}, \quad f_r(r) = 2\pi\lambda_1 re^{-\pi\lambda_2 r^2}, \quad \hat{\phi}_2 =$$

$$\int_{x>0}\int_{r>0}\mathcal{P}_s(r,\theta)f_r(r)f_r(x)drdx$$

To give a more detailed explanation of the equation above, the SINR coverage represents the probability of the SINR exceeding a predefined reference value θ within a particular region in the cognitive radio network.

The OP map generation unit 132 can consider the densities $\lambda_1$, $\lambda_2$ and transmission powers $P_1$, $P_2$ of the primary transmitters (not shown) and secondary transmitters 120 to calculate the average SINR coverage of the secondary transmitters 120 for all reference values θ.

Here, the secondary transmitters 120 may or may not be actual sources of interference, and the density of $\lambda_2'$ of secondary transmitters 120 that are actual sources of interference can be predicted by using the average of the OP values for the previous time slot.

The OP map generation unit 132 can calculate the optimal SINR reference value θ* that can maximize the efficiency of the secondary network while ensuring a high quality of the primary network. Here, the secondary network efficiency can be calculated by using the average SINR coverage mentioned above.

The OP map generation unit 132 can calculate the OP values, which are values representing the probability of successful communication, of the secondary transmitter 120 using the optimum SINR reference value θ* as a reference.

Here, the OP value representing the probability of successful communication is the probability that the expected SINR of a secondary transmitter 120 exceeds the optimum SINR reference value θ*.

The SINR coverage of the a secondary transmitter 120 can be calculated by using the sensing value and sensor location information of the spectrum sensor present at the closest location and the density and transmission power of the secondary transmitter 120.

Even when the distance between a secondary transmitter 120 and a spectrum sensor 110 and the measured value of the corresponding spectrum sensor 110 are the same, the OP value can be different depending on the environment of the primary network and secondary network.

Thus, the OP map generation unit 132 can calculate the probability of successful communication, i.e. OP value, of a secondary transmitter 120 adaptively in consideration of the density and transmission powers of the primary transmitters (not shown) and, as a result, can adaptively assign a frequency access opportunity to the secondary transmitter 120 differently.

Incidentally, for the same sensor measurement values, a network having a higher density (or transmission power) of primary transmitters (not shown) is more likely to have the primary transmitters (not shown) located further away from the secondary transmitter 120.

In this case, the SINR value of the secondary transmitter 120 may be predicted to be higher, and the OP value may be calculated to be higher.

Also, for the same sensor measurement values, a network having a lower density (or transmission power) of primary transmitters (not shown) is more likely to have the primary transmitters (not shown) located closer to the secondary transmitter 120.

Therefore, the predicted SINR value of the secondary transmitter 120 may be lower, and the OP value may be calculated to be a smaller value.

Also, with an increased density of secondary transmitters 120, the OP value may be calculated to be lower, and the SINR reference value θ* for the secondary transmitter 120 may be set higher.

By adjusting the OP value according to the density of the secondary transmitters 120 in this manner, the efficiency of the secondary network can be improved.

Also, the OP map generation unit 132 can compare the locations of the spectrum sensors 110 and designate the covered region corresponding to each spectrum sensor 110.

For designating the covered regions, a Voronoi tessellation technique can be used.

FIG. 6 illustrates an example of covered regions designated according to each spectrum sensor 110, where the locations of the spectrum sensors 110 can be managed in the form of a table as shown in FIG. 6.

Also, the OP map generation unit 132 can calculate an OP matrix OP($O_{i,j}$) for a particular location (i,j).

For this, the OP map generation unit 132 can reference the sensing matrix of the spectrum sensor 110 located closest to the corresponding location (i,j), and the OP matrix for a location that is at a distance of x from a particular spectrum sensor 110 can be calculated as below based on the sensing matrix measured by the corresponding sensor.

| Sensing matrix | | | | | | | |
|---|---|---|---|---|---|---|---|
| ↓ | I(1) | I(2) | I(3) | I(4) | I(5) | . . . | I(N) |
| OP matrix | | | | | | | |
| | $O_{i,j}(1)$ | $O_{i,j}(2)$ | $O_{i,j}(3)$ | $O_{i,j}(4)$ | $O_{i,j}(5)$ | . . . | $O_{i,j}(N)$ | where $O_{i,j}(n) =$ $\mathcal{P}_s(R_{I(n)}, \theta)$ and distance $R_{I(n)}$ satisfies the following equation:

$$\frac{1}{P_1} R_{I(n)}^\alpha - \frac{2\pi\lambda_1}{\alpha - 2} R_{I(n)}^2 - 1 = 0.$$

When an access request message (ARM) for acquiring a frequency access opportunity is received from a secondary transmitter 120, the response message generation unit 133 can generate a spectrum access response message (SARM) responding to the corresponding access request and can have the generated spectrum access response message (SARM) sent to the corresponding secondary transmitter 120.

Here, the spectrum access response message (SARM) sent to the secondary transmitter 120 wishing to acquire a frequency access opportunity can include information on the channel having the highest OP value from the location of the corresponding transmitter as well as the corresponding OP value itself.

That is, the response message generation unit 133 can send information on a channel n having the largest OP value from among the candidate frequency channels accessible by the secondary transmitter 120 positioned at location (i,j) and the corresponding OP value $O_{(i,j)}(n)$ to the secondary transmitter 120.

A possible format for a spectrum access response message sent to a secondary transmitter 120 wishing to acquire a frequency access opportunity is illustrated in FIG. 7.

The control unit 134 can control the components of the dynamic frequency allocation server 130, for example the sensing notification message generation unit 131, OP map generation unit 132, and response message generation unit 133, to perform the operations described above, and can also control the storage unit 135 described below.

The storage unit 135 can store algorithms by which the control unit 134 may control the components of the dynamic frequency allocation server 130, the data (such as processed OP matrices, etc.) required during the control process, or various other data associated with the control process.

FIG. 8 is a flow diagram illustrating the process of allocating a dynamic frequency for a secondary user in a cognitive radio network according to an embodiment of the present invention.

First, the dynamic frequency allocation server 130 may receive spectrum sensing information (SSI), which may include identifier information, location information, and a sensing measurement matrix, from spectrum sensors 110 that have completed sensing procedures (operation S801).

Incidentally, the dynamic frequency allocation server 130 can provide sensing notification messages (SNM's), including information on the sensing frequency band, frequency unit, limit time, etc., to the spectrum sensors 110, and the spectrum sensors 110 can perform the sensing based on the sensing notification messages (SNM's).

After operation S801, the dynamic frequency allocation server 130 may receive an access request message (ARM), including identifier information, location information, and operable band information, from a secondary transmitter 120 wishing to acquire a frequency access opportunity (operation S802).

After operation S802, the dynamic frequency allocation server 130 may generate an 'OP map' representing the probability of successful communication for each region of the cognitive radio network based on one or more of the spectrum sensing information (SSI) received from the spectrum sensors 110, the access request message (ARM) received from the secondary transmitter 120, and the density and transmission power of the primary transmitters (not shown) (operation S803).

As regards the specific method of generating the OP map, the dynamic frequency allocation server 130 may consider the densities $\lambda_1$, $\lambda_2$ and transmission powers $P_1$, $P_2$ of the primary transmitters (not shown) and secondary transmitters 120 to calculate the average SINR coverage of the secondary transmitters 120 with respect to all definable reference values θ (operation S803a).

After operation S803a, the dynamic frequency allocation server 130 may calculate the optimum SINR reference value θ* that can maximize the secondary network efficiency while ensuring the quality of the primary network (operation S803b).

Here, the secondary network efficiency can be calculated by using the average SINR coverage.

After operation S803b, the dynamic frequency allocation server 130 may calculate the OP values, which are the probability values of successful communication, for the secondary transmitter 120 with respect to the optimum SINR reference value θ* (operation S803c).

Here, the OP value, representing the probability of successful communication, is the probability of the expected SINR of the secondary transmitter 120 exceeding the optimum SINR reference value θ*.

Also, the SINR coverage of the secondary transmitter 120 can be calculated by using the sensing value and sensor location information of the spectrum sensor positioned at the closest location and the density and transmission powers of the secondary transmitters 120.

After operation S803c, the dynamic frequency allocation server 130 may compare the locations of spectrum sensors 110 that have performed sensing and designate the covered region of each sensor (operation S803d).

Here, the designation of the covered region for each spectrum sensor 110 can employ a Voronoi tessellation technique.

After operation S803, the dynamic frequency allocation server 130 may reference the sensing matrix of the spectrum sensor 110 positioned closest to the secondary transmitter present at particular location (i,j) to calculate an OP matrix for a location separated by a distance of x from a particular spectrum sensor 110 based on the sensing matrix measured by the corresponding sensor (operation S804).

After operation S804, the dynamic frequency allocation server 130 may send information on the channel n having the largest OP value from among the candidate frequency channels accessible by the secondary transmitter 120 at location (i,j) as well as the corresponding OP value $O_{(i,j)}(n)$ (operation S805).

After operation S805, the secondary transmitter 120 may send a signal to the secondary receiver 140 by using the information regarding the channel n and the corresponding OP value received from the dynamic frequency allocation server 130 (operation S806).

Here, the secondary transmitter 120 can use a random function to send the signal or can wait for a certain duration of time without sending the signal according to the transmission probability and standby probability associated with the OP value.

The descriptions of the present invention set forth above are for illustrative purposes, and a person having ordinary skill in the field of art to which the present invention pertains would understand that the invention can easily be modified into other specific forms without altering the technical spirit or essential features of the present invention.

Therefore, it is to be appreciated that the embodiments described above are illustrative in all aspects and do not limit the present invention.

For example, a component described as having a single form can be implemented in a distributed form in practice, and similarly, components described as having a distributed form can be implemented in a combined form in practice.

The scope of the present invention is defined by the scope of claims presented below and encompasses all modifications or variations that can be derived from the interpretation and scope of the claims as well as their equivalent concepts.

An embodiment of the present invention can be used to enable an efficient use of frequency resources by providing frequency access opportunities to secondary users as much as possible and thus increasing frequency reuse without sacrificing the communication performance of primary users in a cognitive radio network composed of low-performance terminals that are not equipped with a sensing function.

What is claimed is:

1. A dynamic frequency allocation device for allocating a dynamic frequency for a secondary user in a cognitive radio network, the dynamic frequency allocation device comprising:
    an OP map generation unit configured to generate an OP (opportunity) map by using one or more of spectrum sensing information, an access request message, and a density and a transmission power of primary transmitters, the spectrum sensing information comprising identifier information, location information, and a sensing measurement matrix and received from a spectrum sensor which has completed sensing, the access request message comprising identifier information, location information, and operable band information and received from a secondary transmitter wishing to acquire a frequency access opportunity, the OP map representing a probability of successful communication of the secondary transmitter in each region of the cognitive radio network; and
    a response message generation unit configured to generate a response message based on the generated map, the response message comprising a channel having a highest probability of successful communication from among channels accessible from a location of the secondary transmitter and the probability of successful communication,
    wherein the probability of successful communication is a probability of a SINK (signal-to-interference-plus-noise ratio) at a particular location exceeding a predefined reference value $\theta^*$,
    and the OP map representing the probability of successful communication in each region comprises the probability of successful communication of the secondary transmitter in a region in which the spectrum sensor is not installed.

2. The dynamic frequency allocation device of claim 1, wherein the OP map generation unit is configured to:
    calculate an average SINR coverage of the secondary transmitter by using a density and a transmission power of the primary transmitters and the secondary transmitter,
    calculate the predefined reference value $\theta^*$ by using the average SINR coverage, and
    calculate the probability of successful communication of the secondary transmitter with the predefined reference value $\theta^*$ as a reference,
    and wherein the average SINR coverage is an average of SINR coverage values representing probabilities of the SINR of particular locations exceeding the predefined reference value $\theta^*$.

3. The dynamic frequency allocation device of claim 2, wherein the OP map generation unit generates the map by designating a covered region of each spectrum sensor according to a result of comparing locations of the spectrum sensors.

4. The dynamic frequency allocation device of claim 1, wherein the response message generation unit sends the generated response message to the secondary transmitter, and
    the response message sent to the secondary transmitter is used at the secondary transmitter in using a random function to make a selection as regards whether to make an access through the channel according to the probability of successful communication or wait for a predefined duration of time without making an access through the channel according to a probability of failed communication calculated by using the probability of successful communication.

5. The dynamic frequency allocation device of claim 2, wherein a distance between the primary transmitters and the secondary transmitter, the SINR of the secondary transmitter, and the probability of successful communication of the secondary transmitter are proportional to a density or a transmission power of the primary transmitters.

6. The dynamic frequency allocation device of claim 2, wherein the probability of successful communication of the secondary transmitter is inversely proportional to a density of the secondary transmitter, and
    the predefined reference value $\theta^*$ is proportional to the density of the secondary transmitter.

7. A dynamic frequency allocation method by which a dynamic frequency allocation device allocates a dynamic frequency for a secondary user in a cognitive radio network, the dynamic frequency allocation method comprising:

(a) receiving spectrum sensing information from a spectrum sensor which has completed sensing, the spectrum sensing information comprising identifier information, location information, and a sensing measurement matrix;

(b) receiving an access request message from a secondary transmitter wishing to acquire a frequency access opportunity, the access request message comprising identifier information, location information, and operable band information;

(c) generating an OP (opportunity) map by using one or more of the received spectrum sensing information, access request message, and a density and a transmission power of primary transmitters, the OP map representing a probability of successful communication of the secondary transmitter in each region of the cognitive radio network; and (d) generating a response message based on the generated map, the response message comprising a channel having a highest probability of successful communication from among channels accessible from a location of the secondary transmitter and the probability of successful communication, wherein the probability of successful communication is a probability of a SINK (signal-to-interference-plus-noise ratio) at a particular location exceeding a predefined reference value $\theta^*$, and the OP map representing the probability of successful communication of in each region comprises the probability of successful communication of the secondary transmitter in a region in which the spectrum sensor is not installed.

8. The dynamic frequency allocation method of claim 7, further comprising:

(e) sending the generated response message to the secondary transmitter, wherein the response message sent to the secondary transmitter is used at the secondary transmitter in using a random function to make a selection as regards whether to make an access through the channel according to the probability of successful communication or wait for a predefined duration of time without making an access through the channel according to a probability of failed communication calculated by using the probability of successful communication.

9. The dynamic frequency allocation method of claim 7, wherein said step (d) comprises calculating a communication success probability matrix for a location at a predefined distance from a spectrum sensor closest to the secondary transmitter based on the sensing measurement matrix of the closest spectrum sensor.

10. The dynamic frequency allocation method of claim 9, wherein said step (c) comprises:

calculating an average SINR coverage of the secondary transmitter by using a density and a transmission power of the primary transmitters and the secondary transmitter;

calculating the predefined reference value $\theta^*$ by using the average SINR coverage; and calculating the probability of successful communication of the secondary transmitter with the predefined reference value $\theta^*$ as a reference, and wherein the average SINR coverage is an average of SINR coverage values representing probabilities of the SINR of particular locations exceeding the predefined reference value $\theta^*$.

11. A computer program stored in a recorded medium containing a series of instructions for performing the dynamic frequency allocation method of claim 7.

* * * * *